3,118,753
PLANT GROWTH STIMULATING COMPOSITION AND METHOD EMPLOYING MIXTURES OF A GIBBERELLIC ACID AND PURINE COMPOUND
William Shive, 843 E. 38th St., and Charles G. Skinner, 4405 Duval St., both of Austin, Tex.
No Drawing. Filed Apr. 14, 1961, Ser. No. 102,950
14 Claims. (Cl. 71—2.5)

This invention relates to new compositions of matter. More particularly, it relates to synergistic compositions of a gibberellin and substituted purine derivatives with activity which stimulate the rate of germination of seeds. The invention also involves methods of preventing and breaking dormancy and of increasing the rate of rooting, flowering, budding and growth of plants.

Specific conditions of light and temperature are known to be required for efficient germination of many kinds of seed. For example, lettuce seed normally require a light and/or temperature pre-treatment in conjunction with water uptake to prepare the dormant seed for germination. These stimulatory conditions may not be present in an abnormal growing season; thus the planted seed will not germinate with the resultant failure to yield a harvest. Other types of seed are similarly difficult to germinate unless relatively specific conditions of light, moisture, temperature, etc. are present. Therefore, compositions and methods of increasing germination are highly desirable, particularly in areas where water content of the soil may be low. Several chemicals have been studied with respect to the breaking of this dormancy effect including gibberellins, substituted thio- and aminopurines, auxins, vitamins, various amino acids and other chemicals.

We have now found that compositions of gibberellin and substituted purines are substantially superior to either of the components alone in inducing the breaking of dormancy of seed even under favorable external conditions. Further, the concentrations necessary to bring about this stimulatory effect using a synergistic mixture of substituted purine and a gibberellin are substantially lower than those required to induce a comparable stimulation by either of the substances alone within a 24 hour period.

The gibberellins have been described in various publications such as Source Book on Gibberellin by F. H. Stodola, Agricultural Research Service, United States Department of Agriculture, May 1958, particularly publications such as Stodola et al., Arch. of Biochem. and Biophysics 54, 240, 1955. These publications described gibberellins under common names such as Gibberellin $A_1$, of Gibberellin A ($C_{19}H_{24}O_6$); Gibberellin $A_2$ ($C_{19}H_{26}O_6$) and Gibberellin $A_3$, Gibberellin X and gibberellic acid ($C_{19}H_{22}O_6$) and alkali metal salts. The term gibberellins is a generic term and is intended to cover gibberellic acid compounds having similar properties and the empirical formula:

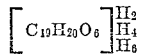

In some instances, the synergistic effects of a mixture of a gibberellin and substituted purines may be augmented by the addition of various natural substances. These include, for example, auxins, vitamins and amino acids, particularly with respect to post-germination growth of the plants.

Pre-soaking Early Curled Simpson lettuce seed in a gibberellin solution, for example gibberellic acid at 30 and 100 γ/ml. (micrograms per milliliter) gives 11 and 15% germination, respectively; and pre-soaking of these seed in 1 and 10 γ/ml. solutions of 6-benzylaminopurine results in 4 and 23% germination, respectively, over a 24 hour period in the absence of light and at 30° C. A combination of gibberellic acid and 6-benzylaminopurine yields a marked synergistic stimulation of rate of lettuce seed germination; for example, a mixture of 1 γ/ml. of the purine derivative and 30 γ/ml. of gibberellic acid gives 71% germination under identical conditions. A similar synergistic effect has been observed using other variety of seed after pre-treatment with these compositions; for example, carpet grass, endive, oak leaf lettuce and the like.

Various substituted 6-thiopurine derivatives have also been found to be synergistic with a gibberellin in stimulating the rate of seed germination, although, in general, they are effective at somewhat higher concentration levels. Pre-treatment of lettuce seed with a 10 γ/ml. solution of 6-benzylthiopurine and then allowing the seed to germinate in the dark at 30° C. for 24 hours, results in only 4% germination of the seed. A 100 γ/ml. solution of gibberellic acid under identical conditions gave 15% germination, while a mixture of 10 γ/ml. of 6-benzylthiopurine and 100 γ/ml. of gibberellic acid produces a synergistic response giving 56% germination under the same non-optimal conditions of temperature and absence of light.

The new compositions of the present invention may be applied to the seed in any one of several ways. For example, they may be applied in aqueous solution or suspension, or in water-organic solvent mixtures. The addition of dilute alkali facilitates solution of the amphoteric purine derivative in water. The compounds may also be suspended in a suitable inert carrier such as talc and applied to the dried seed prior to planting and subsequent watering.

In addition to the above described effect of increasing the rate of seed germination these compositions also stimulate the rooting of certain cuttings. Further, young lettuce plants grown from seed pre-treated in appropriate concentrations of these synergistic compositions, have larger leaves and stems as well as forming a more well developed root system. This latter effect is in contrast to the effect observed after soaking the seed in a gibberellin such as gibberellic acid alone, wherein the root system is frequently abnormal.

The substituted purines which have been found to form synergistic compositions with a gibberellin in affecting plant growth include those of the type 6-alkylamino- and 6-alkylthiopurines, 6 - dialkylaminopurines, 6 - aralkylamino- and 6-aralkylthiopurines, 6 - arylaminopurines, 6-heterocyclicalkylaminopurines and these substituted purines having in the 2-position such groups as hydrogen, amino and fluoro radicals. Specific examples of such compounds include 6-pentyl- and 6-hexylthiopurine; 6-propyl-, 6-n-butyl-, 6-n-pentyl-, 6-n-hexyl and 6-n-heptylaminopurine; 6-dipropylaminopurine; 6 - phenyl-, 6-benzyl-, 6-phenylethyl- and 6-phenylpropylaminopurine; 6-n-hexyl, 6-benzyl-, 6-phenylethyl- and 6-phenylpropylthiopurine; 6α-naphthyl- and 6α-naphthylmethylaminopurine; 6-(2-furfuryl)-, 6-(2-thenyl)-, 6 - (2-pyridylmethyl)-, 6-(3-pyridylmethyl)-, 6 - (4-pyridylmethyl), 2-amino - 6-benzyl-, 2-amino-6-phenylethyl-, 2-amino - 6 - (λ-pyridylmethyl)- and 2-fluoro-6-benzylaminopurines. The preparation of these compounds have been described in the chemical literature by the present inventors and others.

The amount of both a gibberellin and a substituted purine derivative used in the synergistic compositions for each treatment will depend upon the specific activity of the purine derivative as well as the biological system which is being treated. These values including optimum concentrations, time of pretreatment and other factors should be determined for each system under consideration prior to field use.

In general, the substituted purines exert a substantial synergizing effect on the plant growth regulating action of gibberellin in amounts as low as 0.1 part by weight of the purine to 100 parts of a gibberellin, although somewhat larger proportions of the thiopurine derivatives are desirable. Proportions of the substituted purines up to at least as much as 30 parts by weight of purine to 1 part of gibberellin may be used. The optimum proportions will be found to vary to some extent with the total concentration of the component in the treating compositions.

The present application is a continuation-in-part of our application Serial No. 735,671, filed May 16, 1958, now abandoned.

*Example 1*

The seeds were pre-treated for eight hours in the dark at 25° C. in solutions containing about 30 $\gamma$/ml. of gibberellic acid and about 1 $\gamma$/ml. of the substituted purine derivative shown. The seeds were then separated from the pre-treatment solution in the dark using a blue light and finally allowed to germinate at 30° C. in the dark for 24 hours. One hundred or more seeds were used in each test, and the number of seed germinated were calculated as a percentage of the total.

Lettuce seed of the variety (Early Curled Simpson) were treated with substituted purine derivatives indicated and their rate of germination were compared with seed treated only with water, or only with gibberellic acid or only with the indicated purine derivative and allowed to germinate under identical conditions. The following table shows the results obtained:

| Pre-treatment conditions | | Average percent of seed germinated |
|---|---|---|
| Gibberellic acid, $\gamma$/ml. | Substituted purine, $\gamma$/ml. | |
| Water only | | 1 |
| 0 | 6-n-hexylaminopurine, 1 | 8 |
| 30 | do | 69 |
| 0 | 6-n-hexylthiopurine, 1 | 1 |
| 30 | do | 21 |
| 0 | 6-benzylaminopurine, 1 | 9 |
| 30 | do | 71 |
| 0 | 6-benzylthiopurine, 1 | 0 |
| 30 | do | 24 |
| 0 | 6-furfurylaminopurine, 1 | 15 |
| 30 | do | 69 |
| 30 | None | 11 |

The more active compositions will activate germination of seed in periods as low as ten minutes but treatment for up to eight hours does not lower the germination activity.

*Example 2*

Under the conditions described in Example 1 except that about 10 $\gamma$/ml. of the indicated purine derivatives was mixed with about 30 $\gamma$/ml. of gibberellic acid and then allowing the pre-treated lettuce seed (Early Curled Simpson) to germinate under the conditions described in Example 1, the following results were obtained:

| Pre-treatment conditions | | Average percent of seed germinated |
|---|---|---|
| Gibberellic acid, $\gamma$/ml. | Substituted purine, $\gamma$/ml. | |
| Water only | | 1 |
| 30 | None | 11 |
| 0 | 6-n-hexylaminopurine, 10 | 17 |
| 30 | do | 80 |
| 0 | 6-n-hexylthiopurine, 10 | 12 |
| 30 | do | 40 |
| 0 | 6-benzylaminopurine, 10 | 23 |
| 30 | do | 85 |
| 0 | 6-benzylthiopurine, 10 | 4 |
| 30 | do | 39 |
| 0 | Kinetin | 29 |
| 30 | do | 85 |

*Example 3*

Under the conditions described in Example 1 except that about 100 $\gamma$/ml. of gibberellic acid is mixed with about 1 $\gamma$/ml. of the purine derivatives, or about 100 $\gamma$/ml. of gibberellic acid with about 10 $\gamma$/ml. of the purine derivative were used, followed by germination under the conditions described in Example 1, gave synergistic stimulations of germination comparable to those described in Examples 1 and 2.

*Example 4*

The procedure described in Example 1 was used except that the concentration of gibberellic acid used was about 30 $\gamma$/ml., and the substituted purine derivatives used were at a concentration of about 10 $\gamma$/ml. The purine derivatives used included:

6-propylaminopurine
6-butylaminopurine
6-pentaylaminopurine
6-phenylpropylaminopurine
6-thenylaminopurine
6$\alpha$-pyridylmethylaminopurine
6$\beta$-pyridylmethylaminopurine
6-dipropylaminopurine
6-anilinopurine All of these compositions of gibberellic acid and substituted purine derivatives produced a synergistic stimulation of Early Curled Simpson lettuce seed germination under the experimental conditions described in Example 1.

*Example 5*

Cotton seed were pre-soaked for 3 hours in each of the following solutions:

(1) Water
(2) 3 $\gamma$/ml. of 6-benzylaminopurine
(3) 30 $\gamma$/ml. of gibberellic acid
(4) A combination of 2 and 3 above after which, they were allowed to germinate at 25° C. for two days. The germinated seed were then planted in soil and allowed to grow for about one week, after which they were recovered and the indicated measure of growth determined as an average of about 20 plants.

| Treatment | Stem length, mm. | Wt. plant, g. | Main root length, mm. | Length of leaf, mm. | Width of leaf, mm. |
|---|---|---|---|---|---|
| Water | 34.2 | 0.56 | 35.8 | 32.3 | 17.3 |
| Benzylaminopurine | 45.7 | 0.63 | 76.3 | 36.3 | 18.3 |
| Gibberellic acid | 69.8 | 0.81 | 108.6 | 42.8 | 24.9 |
| Gibberellic acid + benzylaminopurine | 82.8 | 0.94 | 129.3 | 47.9 | 28.7 |

*Example 6*

The germination response of seed to the various types of commerically available gibberellins and substituted purine compositions are indicated below using the germinating conditions described in Example 1. Lettuce seed (oak leaf var.) were treated with solutions of 6-benzylaminopurine and/or the four different samples of gibberellin described as:

Code reference             Description of sample
$G_1$ _____ Gibberellic acid, 99%.
$G_2$ _____ Gibberellin $A_1$, Lot No. 689–2055, (Abbott Laboratories).
$G_3$ _____ Gibrel (Trademark), potassium salt of gibberellic acid (Merck & Company, Inc.).
$G_4$ _____ Gibberellin, B grade, Lot No. 102371, (California Corporation for Biochemical Research) (described as a mixture of gibberellins A and X).

Seed were presoaked in solutions of 6-benzylaminopurine at about 3 $\gamma$/ml. and/or the different gibberellins at concentrations of about 30 γ/ml. or 100 γ/ml. for about 5 hours in the dark at 25° C. The seed were then drained, blotted dry and placed in petri dishes on filter paper wetted with water and allowed to germinate at 30° C. for 36 hours in the dark. The percentage of germination was determined by a visual count of the seed; a germinated seed was considered as one in which any evidence of emergence of a radicle could be observed. The following summarizes the results obtained:

| Presoaking solution | | | |
|---|---|---|---|
| 6-benzylaminopurine, γ/ml. | Gibberellin sample | | Percent germination |
| | Code reference | Concentration, γ/ml. | |
| Water blank control | | | |
| 3 | None | | 0 |
| None | G₁ | 30 | 9 |
| Do | G₂ | 30 | 0 |
| Do | G₃ | 30 | 4 |
| Do | G₄ | 30 | 0 |
| 3 | G₁ | 30 | 6 |
| 3 | G₂ | 30 | 69 |
| 3 | G₃ | 30 | 89 |
| 3 | G₄ | 30 | 81 |
| 3 | G₁ | 100 | 64 |
| 3 | G₂ | 100 | 75 |
| 3 | G₃ | 100 | 81 |
| 3 | G₄ | 100 | 85 |
| 3 | | 100 | 77 |

*Example 7*

Using the same experimental procedure as described in Example 6 and similar samples of gibberellin with the indicated code reference numbers, oak leaf var. lettuce seed were presoaked in solutions containing 10 γ/ml. of 6-benzylaminopurine and/or solutions of 30 γ/ml. or 100 γ/ml. of the gibberelin samples. The results obtained are summarized as follows:

| Presoaking solution | | | |
|---|---|---|---|
| 6-benzylaminopurine, γ/ml. | Gibberellin sample | | Percent germination |
| | Code reference | Concentration, γ/ml. | |
| Water blank control | | | |
| 10 | None | | 5 |
| 10 | G₁ | 30 | 85 |
| 10 | G₂ | 30 | 84 |
| 10 | G₃ | 30 | 77 |
| 10 | G₄ | 30 | 82 |
| 10 | G₁ | 100 | 77 |
| 10 | G₂ | 100 | 77 |
| 10 | G₃ | 100 | 83 |

The effect on the rate of seed germination of pre-treatment with the several gibberellin samples alone at the levels indicated gave a negligible response as indicated in Example 6. On the other hand, the new compositions of the present invention show a high percentage of germination.

*Example 8*

Using an experimental procedure similar to that described in Example 6, a sample of Gibberellin A₂ obtained from The University of Tokyo, Department of Agricultural Chemistry, Bunkyo-ku, Tokyo, Japan, was admixed with the concentrations of 6-benzylaminopurine indicated below, and the resulting solutions were used to presoak oak leaf var. lettuce seed. The pre-treated seed were then allowed to germinate in the dark at 30° C. for about 60 hours. The percentage of germination was determined by a visual count of the seed; a germinated seed was considered as one in which any evidence of emergence of a radicle could be observed. The following summarized the results obtained:

| Presoaking solution | | Percent germination |
|---|---|---|
| 6-benzylaminopurine, γ/ml. | Gibberellin A₂, γ/ml. | |
| 1 | Water blank control | 0 |
| 2 | 3 | None | 35 |
| 3 | 10 | None | 28 |
| 4 | None | 100 | 2 |
| 5 | 3 | 100 | 88 |
| 6 | 10 | 100 | 92 |

*Example 9*

Using experimental conditions similar to that described in Example 1, a synergistic germination response was also found using various concentrations of 2-amino-6-(substituted)aminopurines (described below) and gibberellic acid for the presoaking solutions. These results are summarized as follows:

| Presoaking solutions | | | Germination, percent (24 hours) |
|---|---|---|---|
| Purine derivative | Conc., γ/ml. | Gibberellic acid, γ/ml. | |
| Water blank control | | | 0 |
| None | | 100 | 20 |
| 2-amino-6-benzylamino- | 10 | None | 0 |
| 2-amino-6-(β-phenylethyl)amino- | 10 | None | 1 |
| 2-amino-6-(γ-pyridylmethyl)amino- | 10 | None | 8 |
| 2-amino-6-benzylamono- | 10 | 100 | 84 |
| 2-amino-6-(β-phenylethyl)amino- | 10 | 100 | 60 |
| 2-amino-6-(γ-pyridylmethyl)amino- | 10 | 100 | 64 |
| 2-amino-6-benzylamino- | 30 | None | 19 |
| 2-amino-6-(β-phenylethyl)amino- | 30 | None | 3 |
| 2-amino-6-(γ-pyridylmethyl)amino- | 30 | None | 11 |
| 2-amino-6-benzylamino- | 30 | 100 | 65 |
| 2-amino-6-(β-phenylethyl)amino- | 30 | 100 | 50 |
| 2-amino-6-(γ-pyridylmethyl)amino- | 30 | 100 | 55 |

*Example 10*

Using the assay conditions described in Example 1, the results indicated below demonstrate that 2-fluoro-6-benzylaminopurine is also synergistic with gibberellic acid in augmenting the rate of seed germination.

| | Presoaking solutions | Germination, percent (24 hours) |
|---|---|---|
| 1 | Water blank control | 5 |
| 2 | 2-fluoro-6-benzylaminopurine, 10 γ/ml | 20 |
| 3 | Gibberellic acid, 100 γ/ml | 15 |
| 4 | 2-fluoro-6-benzylaminopurine, 10 γ/ml. + gibberellic acid, 100 γ/ml. | 85 |

We claim:
1. A composition of matter effective in stimulating plant growth which comprises gibberellic acid compounds and a synergistically effective proportion of a 6-substituted purine selected from the group consisting of those having the formulae:

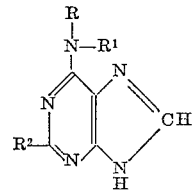

and

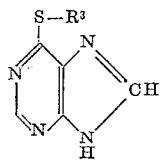

in which R is a member of the group consisting of alkyl radicals of 3 to 7 carbon atoms, phenyl, benzyl, phenylethyl, phenylpropyl, thenyl and pyridylmethyl radicals, $R^1$ is a member of the group consisting of hydrogen and a lower alkyl radical, $R^2$ is a member of the group consisting of hydrogen, amino and fluoro radicals and $R^3$ is a member of the group consisting of alkyl radicals of 3 to 7 carbon atoms and the benzyl radical, said gibberellic acid compounds and 6-substituted purines being present in plant growth stimulating quantities.

2. A composition of matter according to claim 1 wherein the gibberellic acid compounds is an alkali metal salt of gibberellic acid.

3. A composition of matter in accordance with claim 1 wherein the 6-substituted purine is 6-benzylaminopurine.

4. A composition of matter effective in stimulating plant growth comprising an alkali metal salt of gibberellic acid and a synergistically effective proportion of 6-benzylaminopurine the said gibberellic acid salt and 6-benzylaminopurine being present in sufficient amounts to form an effective plant growth stimulating composition.

5. A composition of matter effective in stimulating plant growth comprising the potassium salt of gibberellic acid and a synergistically effective proportion of 6-benzylaminopurine, the combined potassium gibberellate and 6-benzylaminopurine being present in amounts sufficient to form an effective plant growth stimulating composition.

6. A composition of matter effective in stimulating plant growth comprising the potassium salt of gibberellic acid and a synergistically effective proportion of 6-hexylaminopurine, the combined potassium gibberellate and 6-hexylaminopurine being present in amounts sufficient to form an effective plant growth stimulating composition.

7. A composition of matter effective in stimulating plant growth which comprises gibberellic acid and a synergistically effective proportion of 6-benzylaminopurine, the combined amounts of gibberellic acid and 6-benzylaminopurine being present in plant growth stimulating quantities.

8. A method of stimulating and accelerating the growth and germination of plants and seeds which comprises treating said plants and seeds with a composition of matter comprising gibberellic acid compounds and a synergistically effective proportion of a 6-substituted purine selected from the group consisting of those having the formulae:

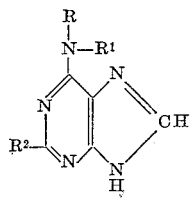

and

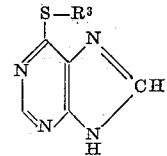

in which R is a member of the group consisting of alkyl radicals of 3 to 7 carbon atoms, phenyl, benzyl, phenylethyl, phenylpropyl, thenyl and pyridylmethyl radicals, $R^1$ is a member of the group consisting of hydrogen and lower alkyl radicals, $R^2$ is a member of the group consisting of hydrogen, amino and fluoro radicals and $R^3$ is a member of the group consisting of lower alkyl radicals of 3 to 7 carbon atoms and the benzyl radical, the combined amounts of said gibberellic acid compounds and 6-substituted purine being present in plant growth stimulating quantities.

9. A method in accordance with claim 8 wherein the gibberellic acid compounds is an alkali metal salt of gibberellic acid.

10. A method in accordance with claim 8 wherein the 6-substituted purine is 6-benzylaminopurine.

11. A method of stimulating the germination of plant seeds which comprises treating the seeds with a composition of matter comprising an alkali metal salt of gibberellic acid and a synergistically effective proportion of 6-benzylaminopurine, the combined amounts of alkali metal salt of gibberellic acid and 6-benzylaminopurine being present in plant growth stimulating quantities.

12. A method of stimulating the germination of plant seed which comprises treating the seed with a composition of matter comprising the potassium salt of gibberellic acid and a synergistically effective proportion of 6-benzylaminopurine, the combined amounts of the potassium salt of gibberellic acid and 6-benzylaminopurine being present in plant growth stimulating quantity.

13. A method of stimulating the germination of plant seeds which comprises treating the seeds with a composition of matter comprising the potassium salt of gibberellic acid and a synergistically effective proportion of 6-hexylaminopurine, the combined amounts of the potassium salt of gibberellic acid and 6-hexylaminopurine being present in plant growth stimulating quantity.

14. A method of stimulating the germination of plant seeds which comprises treating the seeds with a composition of matter comprising gibberellic acid and a synergistically effective proportion of 6-benzylaminopurine, the combined amounts of gibberellic acid and 6-benzylaminopurine being present in plant growth stimulating quantity.

References Cited in the file of this patent

UNITED STATES PATENTS

| | | |
|---|---|---|
| 2,842,051 | Brian et al. | July 8, 1959 |
| 2,966,488 | Shive et al. | Dec. 27, 1960 |
| 2,993,048 | Shive et al. | July 18, 1961 |

OTHER REFERENCES

Scott, Jr., et al.: Science, vol. 126, pages 122 and 123, July 1957.

Vasil: Science, vol. 126, No. 3286, Dec. 20, 1957, pages 1294 and 1295.